Patented Dec. 18, 1934

1,984,763

UNITED STATES PATENT OFFICE 1,984,763

MANUFACTURE OF WURTZITE FROM ZINC BLENDE

Joachim Rockstroh, Cologne-Deutz, Friedrich Raspe, Leverkusen I. G.-Werk, and Heinrich Kircher, Leverkusen-Schlebusch, Germany, assignors to I. G. Farbenindustrie Aktiengesellschaft, Frankfort-on-the-Main, Germany No Drawing. Application September 26, 1932, Serial No. 634,988. In Germany October 1, 1931

1 Claim. (Cl. 23—1)

This invention relates to the manufacture of wurtzite from zinc blende. It consists in adding to the zinc blende a small amount of another substance which has the crystal structure of wurtzite, but being chemically different therefrom, and heating the mixture.

It is known that polymorphy can be observed on a number of elements and compounds. With the difference in the crystal structure also numerous other properties related therewith, such as cleavability, optic, thermic and electric conducting power, etc. may vary. In the technic it is of importance in such cases to manufacture from a substance only a definite modification if this modification shows certain technically valuable properties to a decided extent and is superior to other modifications of the same substance.

As is known the transformation of polymorphous substances is effected under certain conditions of temperature and pressure and sometimes depends on the time during which temperature and pressure influence the compounds.

We have found that the transformation of zinc blende into wurtzite may be considerably favored by adding to zinc blende before or during the transformation such substances which themselves possess the crystal structure of the wurtzite but being chemically different therefrom. The effect of these additions is extended to the temperature at which transformation may take place and also to the time, such, that either the transformation of zinc blende into wurtzite at the same temperature at which otherwise the zinc blende is transformed, is performed in a much shorter time or, the transformation is performed during the usually applied time at a lower temperature wholly or partially, but then in a much better yield than without additions. By the saving of time or the saving of energy necessary for heating a great technical advance is attained.

A further advantage of the present invention is that working at a lower temperature in the transformation process becomes possible; thereby damages, occurring when zinc blende is treated without any addition and at a higher temperature required in such a case, can be avoided. The higher temperatures required would compensate the advantages brought about by the transformation, for example, those of color-technical nature, by impairing other qualities.

The favorable effect of the additions can already be observed when using small quantities thereof; this must be considered a further technical advance because undesired costs in the technical process are avoided.

The process may be carried out in such a manner that the additions favorably influencing the transformation of zinc blende into wurtzite may be applied before calcining in a wet or dry state to the zinc blende. The additions may also be made during the calcining process; or, calcining may be effected in two stages, whereby the substance is added after the first stage. Further, the substance favorably influencing the transformation may be formed in the mixture itself either from the single compounds already present in the mixture or on account of a change they undergo in the transformation process.

The invention is further illustrated by the following example without being restricted thereto:—

Example 10000 parts by weight of precipitated zinc sulfide are intimately mixed with 1 part by weight of a cobalt salt, for instance, cobalt sulfate or any other cobalt salt which can easily be transformed into cobalt sulfide, and some samples are heated for one hour each to different temperatures. Under the same conditions precipitated zinc sulfide is heated without the addition of cobalt. The precipitated zinc sulfide is crystallographically identical with zinc blende. While the pure zinc sulfide is transformed above 600° C. into pure wurtzite and then between 700° and 1000° C. into a mixture of wurtzite and zinc blende and first above 1000° C. is finally transformed into pure wurtzite, the zinc sulfide heated with the addition of cobalt already above 600° C. forms wurtzite and maintains this crystal form also at higher temperatures. The effect attained with the addition of cobalt resides in the formation of cobalt sulfide in the starting mixture during the heating process. This cobalt sulfide crystallizes in the same crystal form as wurtzite and the effect of the new process is such that at temperatures between 700° and 1000° C. the reformation of the wurtzite into the form of the zinc blende is avoided and the formation of pure wurtzite takes place. Instead of cobalt sulfide also each desired other substance, crystallizing in the wurtzite lattice may be employed, for instance, iron sulfide and nickel sulfide.

We claim:—

Process of preparing wurtzite from zinc blende consisting in heating zinc blende with a small amount of a compound crystallizing in the wurtzite lattice but being chemically different therefrom.

JOACHIM ROCKSTROH.
FRIEDRICH RASPE.
HEINRICH KIRCHER.